US009843734B2

(12) United States Patent
DiMenichi

(10) Patent No.: US 9,843,734 B2
(45) Date of Patent: Dec. 12, 2017

(54) RETRACTABLE CAMERA FOR VEHICLE

(71) Applicant: David DiMenichi, Glenwood, NJ (US)

(72) Inventor: David DiMenichi, Glenwood, NJ (US)

(*) Notice: Subject to any disclaimer, the term of this patent is extended or adjusted under 35 U.S.C. 154(b) by 119 days.

(21) Appl. No.: 15/048,184

(22) Filed: Feb. 19, 2016

(65) Prior Publication Data

US 2017/0244902 A1    Aug. 24, 2017

(51) Int. Cl.
| | | |
|---|---|---|
| *B60R 1/00* | (2006.01) | |
| *H04N 5/232* | (2006.01) | |
| *H04N 5/225* | (2006.01) | |
| *H04N 7/18* | (2006.01) | |
| *B60R 11/04* | (2006.01) | |
| *B60R 11/00* | (2006.01) | |

(52) U.S. Cl.
CPC .......... *H04N 5/23296* (2013.01); *B60R 1/002* (2013.01); *B60R 11/04* (2013.01); *H04N 5/2253* (2013.01); *H04N 5/23293* (2013.01); *H04N 7/183* (2013.01); *H04N 7/188* (2013.01); *B60R 2011/004* (2013.01); *B60R 2300/802* (2013.01)

(58) Field of Classification Search
CPC ...... H04N 5/23296; B60R 1/002; B60R 11/04
USPC ........................................................ 348/837
See application file for complete search history.

(56) References Cited

U.S. PATENT DOCUMENTS

| | | | |
|---|---|---|---|
| 5,708,857 A | 1/1998 | Ishibashi | |
| 5,793,420 A | 8/1998 | Schmidt | |
| 6,175,300 B1 | 1/2001 | Kendrick | |
| 6,351,208 B1 | 2/2002 | Kaszczak | |
| 6,972,675 B2 | 12/2005 | Mills et al. | |
| 8,305,443 B2 | 11/2012 | Buschmann et al. | |
| 8,633,810 B2 | 1/2014 | Luo et al. | |
| 2005/0146607 A1 | 7/2005 | Linn et al. | |
| 2007/0216770 A1 | 9/2007 | Chang | |
| 2008/0079553 A1 | 4/2008 | Boice | |
| 2014/0197649 A1* | 7/2014 | Hansen | B60R 11/04 292/336.3 |

FOREIGN PATENT DOCUMENTS

EP        0484990 A1    5/1992

* cited by examiner

*Primary Examiner* — Jeffery Williams
(74) *Attorney, Agent, or Firm* — Michael J. Feigin, Esq.; Feigin & Fridman

(57) ABSTRACT

A front or rear camera on a rotating arm where rotation of the camera is coupled to movement of the rotating arm such that when the rotating arm is against the front or rear of the car (parallel thereto) the camera points away from the vehicle. When the arm is rotated away from the car, the camera rotates towards the car pointing to one of a left blinker, right blinker, or license plate. This can be controlled via a manual switch in the car which rotates one or both of the camera and rotating arm or automatically as a function of placing the car in reverse or using a turn signal, such as by way of acting on output from a car's diagnostic port.

17 Claims, 7 Drawing Sheets

RETRACTABLE CAMERA FOR VEHICLE

FIELD OF THE DISCLOSED TECHNOLOGY

The disclosed technology relates generally to cameras, and more specifically to vehicle-mounted cameras.

BACKGROUND OF THE DISCLOSED TECHNOLOGY

Cars and cameras as of late go together like a horse and carriage. Dashboard cameras are well known to provide evidence of the truth in the event of a car accident. In car accidents where a dashboard camera is involved, no longer can another party claim the car went through a red light when the camera clearly shows that it was green or that the car hit into a pedestrian in the crosswalk, when the pedestrian staged an accident for an insurance payment. In other cases, rear view cameras are used to see behind a car. This helps when placing a car in reverse, in order to avoid hitting into an object.

Thus, cameras exist on cars directed at the exterior surrounding thereof. There is still room for improvement in directing cameras to specific objects and devices which are lacking in the prior art, as will be explained below.

SUMMARY OF THE DISCLOSED TECHNOLOGY

A retractable camera mounted to a rear and/or front side of a vehicle has a mount fixed to the rear or front of the vehicle, a rotating arm rotatably connected to the mount, and a camera rotatably connected to the rotating arm. The rotating arm has, in one embodiment, a furtherest range of motion between two extremes: a first extreme substantially parallel to the rear or front of the vehicle, and a second extreme substantially perpendicular to the rear or front of the vehicle. The change in camera direction is, in embodiments of the disclosed technology, coupled with rotation of the rotating arm such that when the rotating arm is substantially parallel to a rear or front of a vehicle, the camera points away from the vehicle in a substantially rearward or forward direction. The camera direction can be further coupled with rotation of the rotating arm such that when the rotating arm is substantially perpendicular to the rear or front of the vehicle, a center of a frame of view of the camera substantially shows a respective rear turn signal, brake/reverse light and license plate light or front turn signal/headlight.

A switch inside an interior of a vehicle can be electrically coupled with the rotating arm which, when utilized, causes one of the following three configurations to be carried out:

a) the rotating arm is fully retracted substantially parallel to a rear or front side of the car and the camera points substantially in an opposite direction away from the car;

b) the rotating arm is substantially perpendicular to the rear or front side of the car and the camera points substantially towards a left blinker, brake/reverse or license plate light; and c) the rotating arm is substantially perpendicular to the rear side of the car and the camera points substantially towards a right blinker, brake/reverse or license plate light.

The aforementioned switch can be a manual switch controlled by a passenger (including the driver) in the vehicle to effectuate showing of a blinker, license plate, rear and/or front view of the vehicles, headlights, blinkers. The switch, in embodiments, is utilized based on one of a change in state of the left blinker, right blinker or gear of the vehicle. Use of the left or right blinker causes, in embodiments, a switch to carry out one of the configurations a) and b) corresponding to the blinker used. Placing the gear of the vehicle in reverse causes the switch to carry out the configuration c). The switch can act as a function of output from an onboard diagnostics port of the car.

Another way of describing aspects of the disclosed technology is as a retractable camera system with a visual output within an interior of the vehicle within a frame of view of a driver of the vehicle. A camera mounted to a rear or front of the vehicle on a rotating arm such that when the rotating arm is rotated away from the vehicle, a frame of view of the camera includes a respective rear or front blinker of the vehicle which is, in turn, shown on the visual output.

When the rotating arm is rotated such that an end of the rotating arm with the camera is substantially a same distance from a rear (or front) of the vehicle as a portion of the rotating arm which connects to a mount on the vehicle, the camera points away from the vehicle showing a rear (or front) view on the visual output.

A switch for setting a direction of the camera and an amount of rotating of the rotating arm is provided within the vehicle in embodiments of the disclosed technology. The switch is controlled as a function of output of an onboard diagnostics port in embodiments of the disclosed technology, the output including an indication of use of at least one of a blinker and change in gear. For example, activation of a blinker causes the camera to point towards an activated blinker and the rotating arm to move the camera away from the vehicle. Setting the gear to reverse causes the camera to point rearward with respect to a body of the vehicle, and causes the rotating arm to move the camera towards the vehicle in an embodiment of the disclosed technology.

"Substantially," for purposes of this disclosure, is defined as "within a tolerance level of 5% or less." It should also be understood that any device or element claims can "be comprised of," or "consist of" the parts there listed, based on the claimed terminology. Further, the term "and/or" should be construed as meaning either or both terms joined by the phrase.

DETAILED DESCRIPTION OF EMBODIMENTS OF THE DISCLOSED TECHNOLOGY

A front or rear camera on a rotating arm where rotation of the camera is coupled to movement of the rotating arm such that when the rotating arm is against the front or rear of the car (parallel thereto) the camera points away from the vehicle. When the arm is rotated away from the car, the camera rotates towards the car pointing to one of a left blinker, right blinker, or license plate. This can be controlled via a manual switch in the car which rotates one or both of the camera and rotating arm or automatically as a function of placing the car in reverse or using a turn signal, such as by way of acting on output from a car's diagnostic port.

Embodiments of the disclosed technology will become clearer in view of the following description of the figures.

Figure 4:
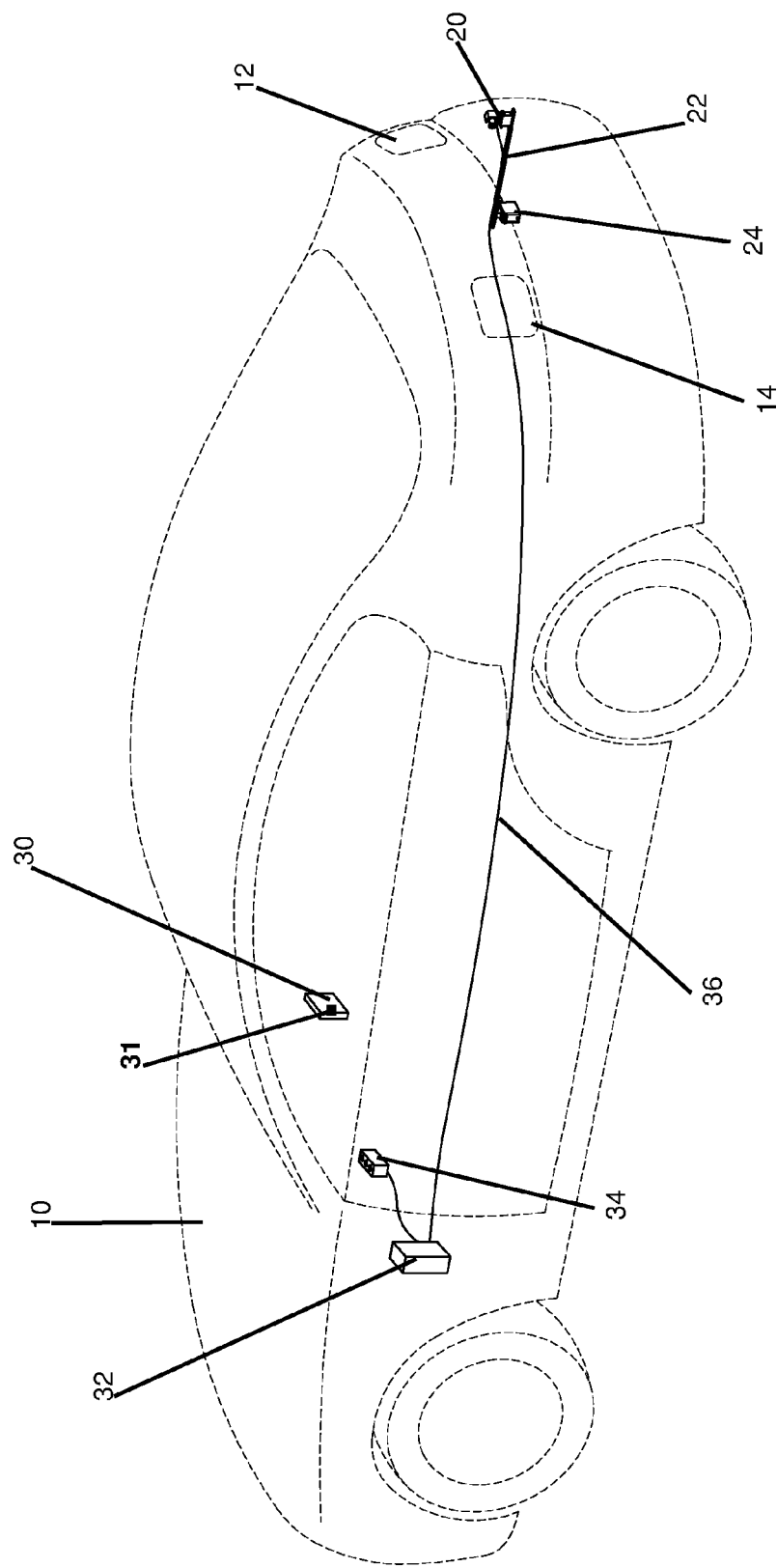
FIG. 4 shows a perspective view of a vehicle with the rear camera, display, and controller, in an embodiment of the disclosed technology.

Referring now to FIG. 4, FIG. 4 shows a perspective view of a vehicle with the rear camera, display, and controller, in an embodiment of the disclosed technology. Here, there is a camera 20 mounted to a rotating arm 22 which is, in turn, mounted to a mount 24. The mount 24 can be fixedly mounted to any one of a license plate, license plate holder, fender, or other item on the rear or front side of a car, such as car 10. The rotating or retractable arm 22 can be extending inwards and outwards telescopically as well as towards and away from the vehicle. That is, when retracted fully or in a full retracted position, the retractable arm 22 is at it's shortest length of operation and perpendicular or substantially perpendicular to the rear or front of the vehicle, fender, license plate, or other fixed and generally planar point of reference on the front or rear of the vehicle. When extended, the retractable arm 22 can either or both telescope outwards to a greater length or have an acute or right angle to the rear or front of the vehicle (with reference to any of the items described above).

Still referring generally to FIG. 4, the camera 20 can also rotate with respect to the retractable arm 22, such that it can point towards the corners of / lights on the car, such as rear lights 12 and 14 shown in FIG. 4. It can also point towards the license plate (front or back) or fully away from the vehicle, such as behind or in front of the vehicle, as will become more clear in the discussion of the other figures.

Now referring to other elements of FIG. 4 in specific, the camera can be controlled wired or wirelessly. A wire 36 can extend to an OBD (on board diagnostics) port of a car 34 or to a battery 32 of the car to power the camera 20 and motors/actuators used to rotate or extending the rotating arm 22. The OBD port can be used to control the camera automatically, as will be discussed with reference to FIG. 6 below. Or the camera can be communicated to wirelessly to change it's angle, power on/off status, and angle of the arm. In any case, the output of the camera 20 is exhibited on a display such as an in car display 30 with buttons 31 which can be used to control the camera.

Figure 1:
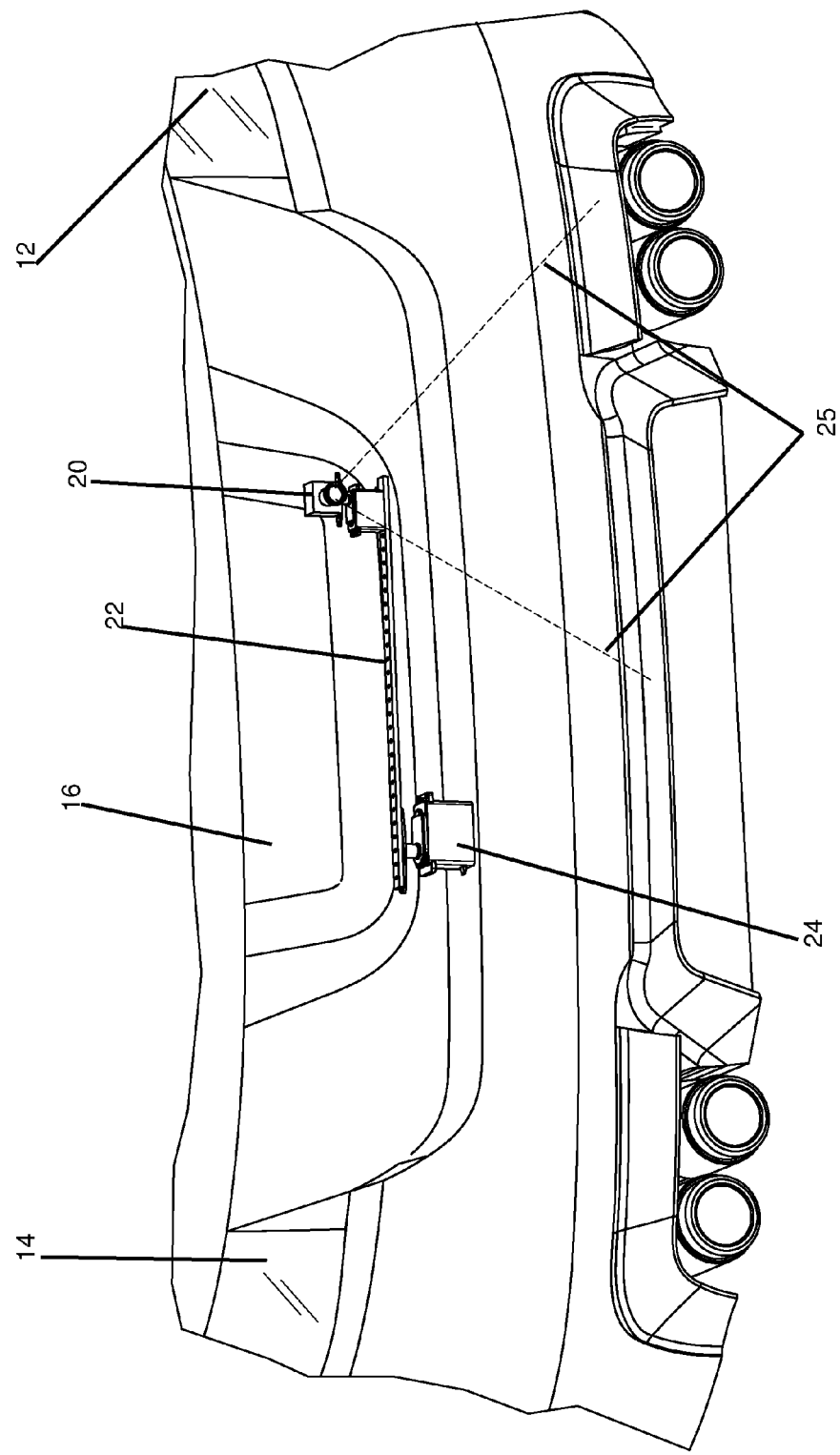
FIG. 1 shows a rear view of a vehicle with retracted camera with a frame of vision directed behind the vehicle, in an embodiment of the disclosed technology.

FIG. 1 shows a rear view of a vehicle with retracted camera with a frame of vision directed behind the vehicle, in an embodiment of the disclosed technology. Here, the camera 20 points towards the back of the vehicle such that it has a frame of view 25 showing behind the vehicle. This can be used as a rear view or backup camera. The retractable arm 22 is full retracted and lies against the rear of the vehicle and/or parallel to the license plate or other element at the rear of the vehicle. The retractable arm 22 is rotatably connected to a mounting device 24, here shown mounted to the back side of the vehicle and on the top side of the bumper.

Figure 2:
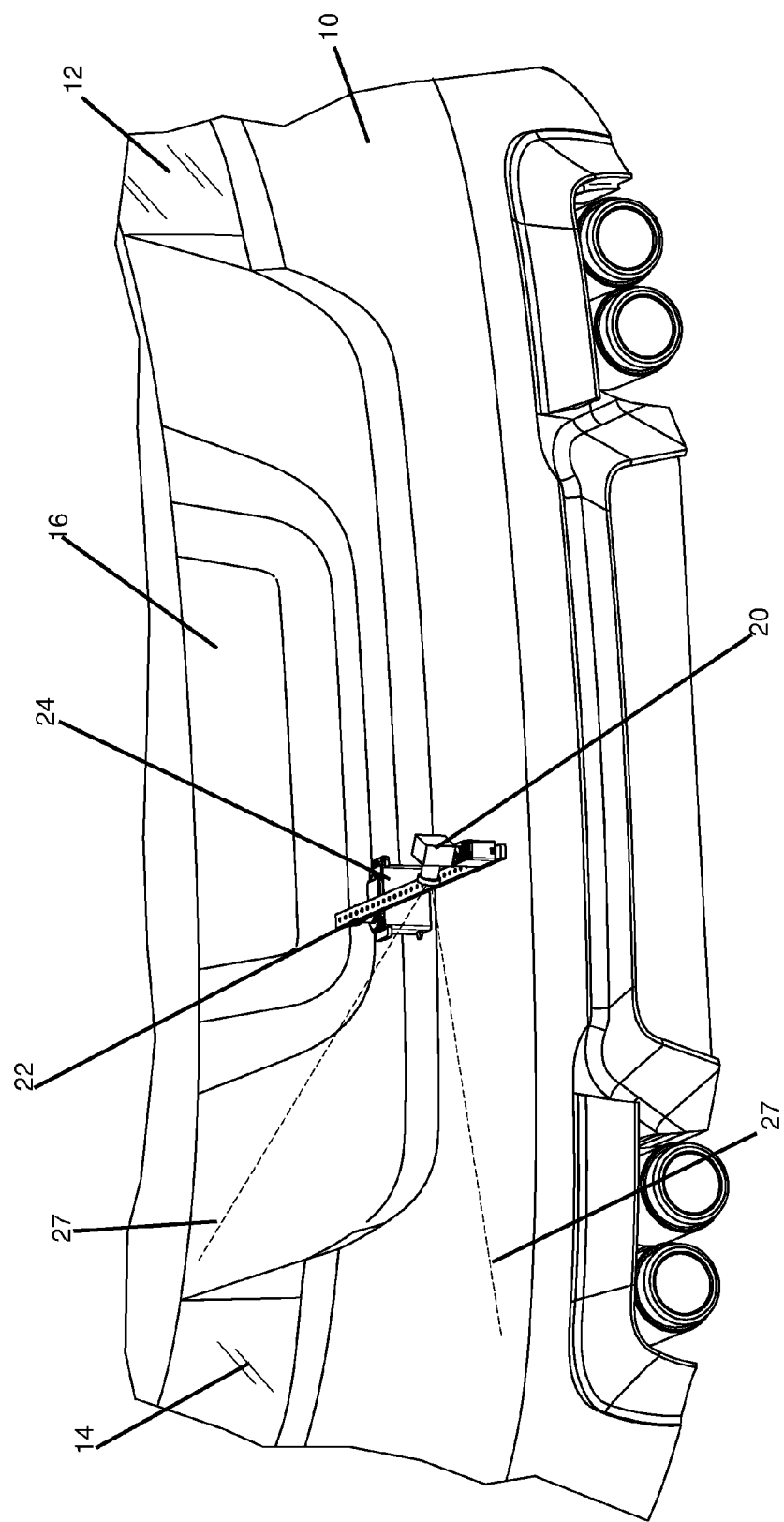
FIG. 2 shows a rear view of a vehicle with extended camera with a frame of vision directed to a left blinker, in an embodiment of the disclosed technology.

FIG. 2 shows a rear view of a vehicle with extended camera with a frame of vision directed to a left blinker, in an embodiment of the disclosed technology. In this view, the camera 20 is pointed towards a rear light or blinker 14 such that the light 14 is in the middle of the frame of view 27. Likewise, one could point the camera 20 to the right 90 degrees and point the camera towards light 12. In this embodiment the rotatable arm 22 can be retracted or extended. That is, to go from the position shown in FIG. 1 to the position shown in FIG. 2, in some embodiments, one uses a telescoping arm and in other embodiments one simply rotates the arm and changes the angle of the camera 20.

Figure 3:
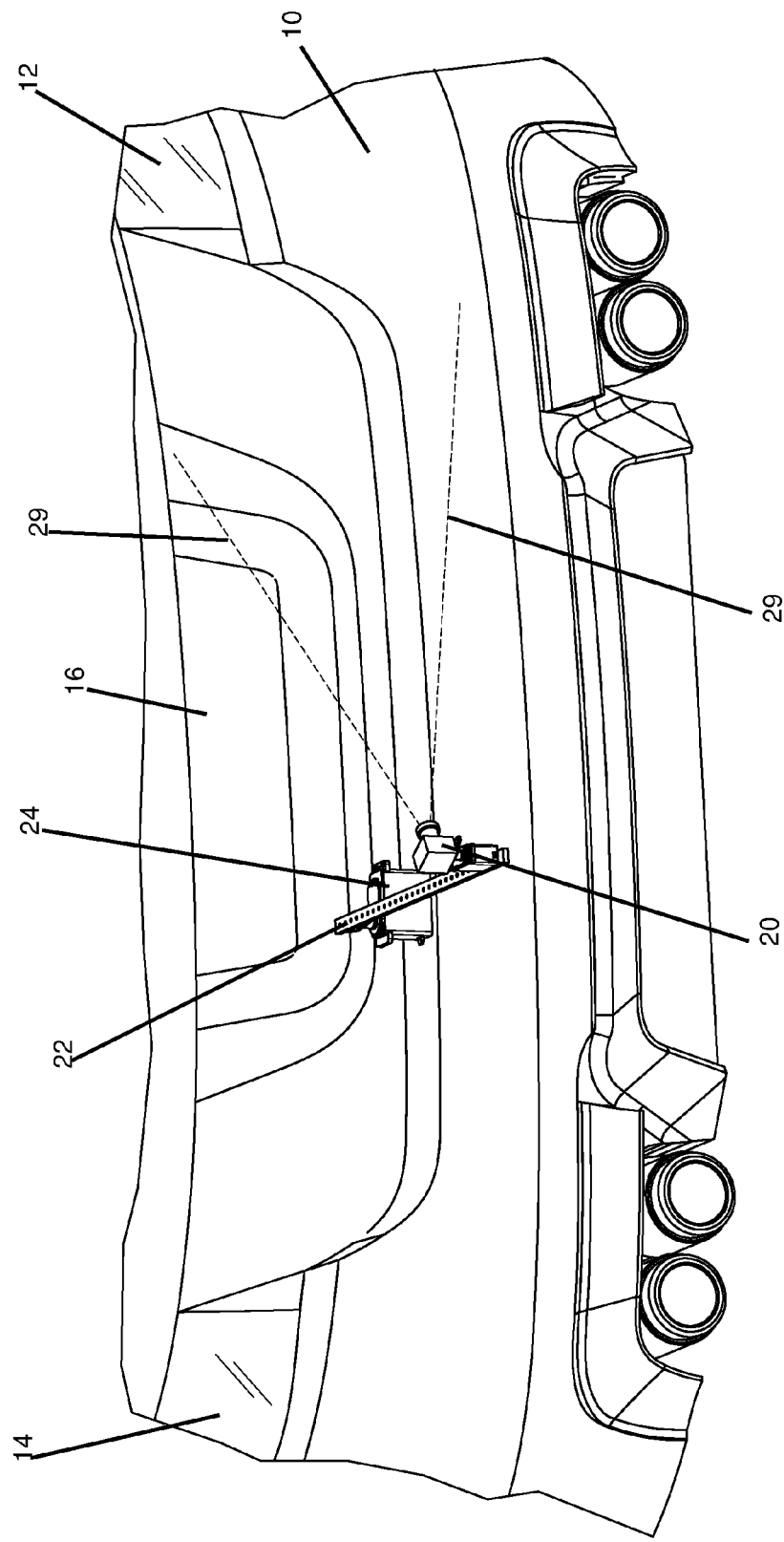
FIG. 3 shows a rear view of a vehicle with extended camera with a frame of vision directed to a right blinker, in an embodiment of the disclosed technology.

FIG. 3 shows a rear view of a vehicle with extended camera with a frame of vision directed to a right blinker, in an embodiment of the disclosed technology. As discussed with reference to FIG. 2, the camera 20 here carries out the same function and angle (albeit in the negative direction) compared to the version shown in FIG. 2 except that the camera points to the right blinker 12 instead of the left blinker. As such, it's frame of view 29 is centered around the right blinker 12.

Figure 5:
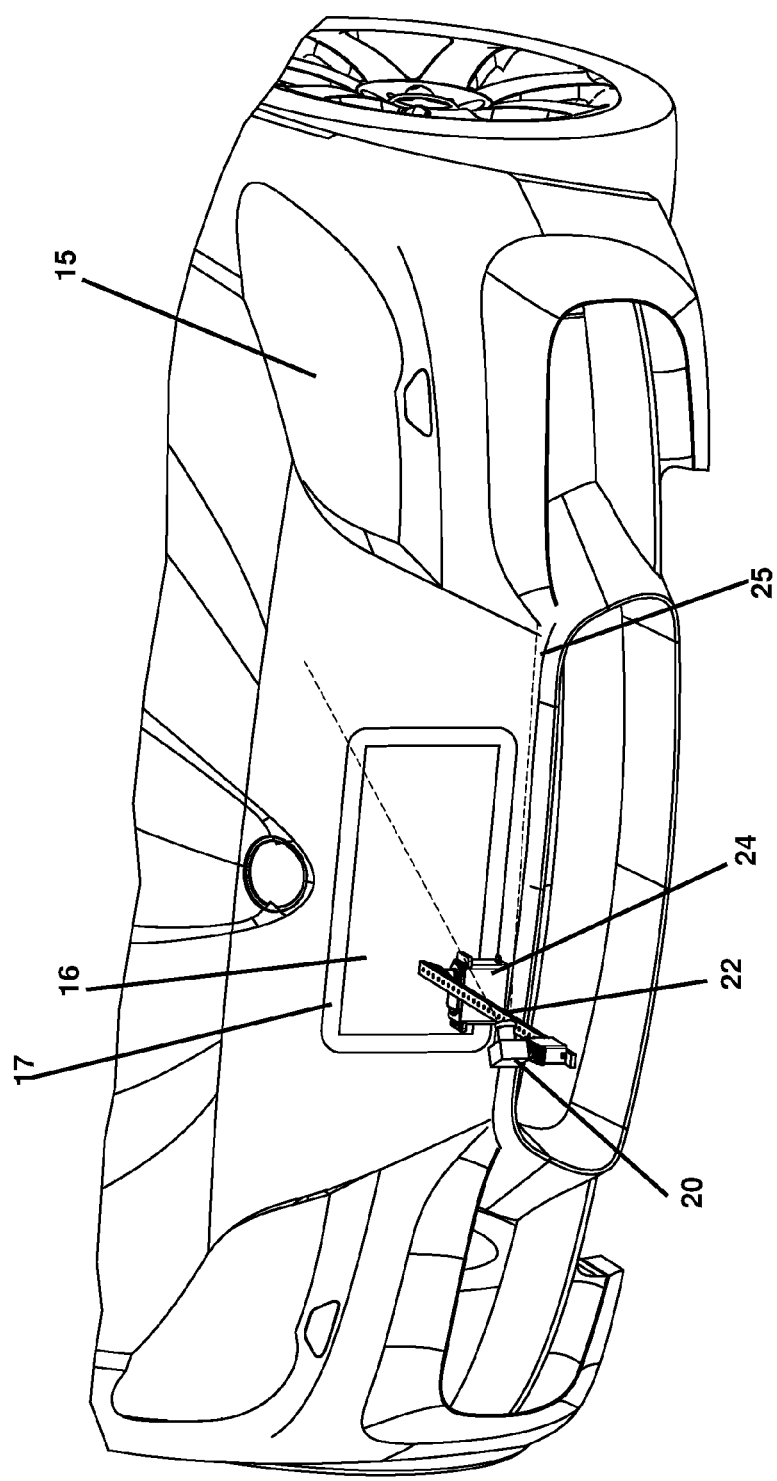
FIG. 5 shows a front view of a vehicle with extended camera with a frame of vision directed to a right blinker, in an embodiment of the disclosed technology.

FIG. 5 shows a front view of a vehicle with extended camera with a frame of vision directed to a right blinker, in an embodiment of the disclosed technology. Like the rear view shown in FIGS. 2 and 3, this is a corresponding front view pointing towards one of the lights 17. The camera 20 is centered in it's frame of view 25 around this light 15. The camera could also be pointed directly forwards.

Figure 6:
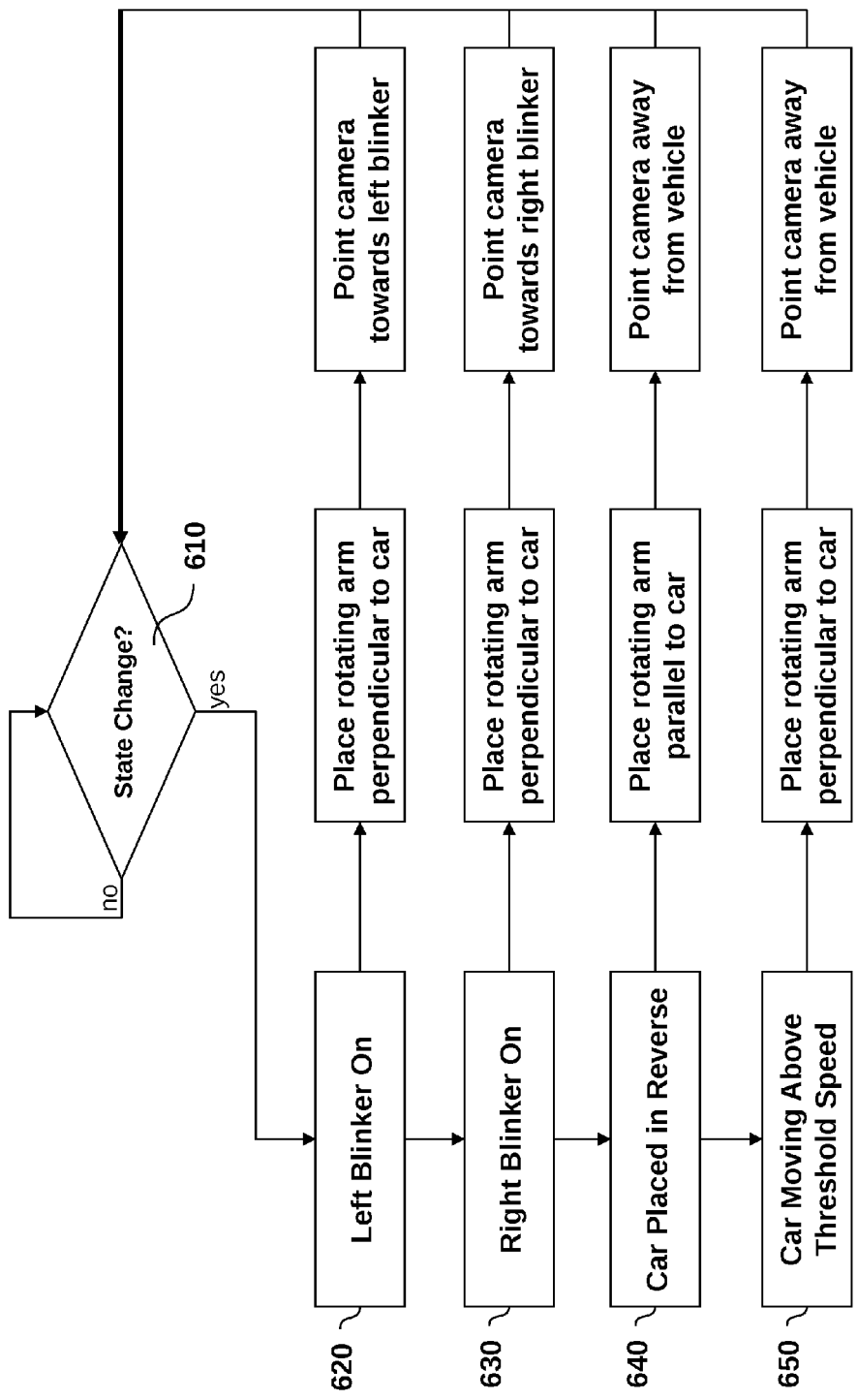
FIG. 6 shows a high level block diagram of a logic decisions made to choose how to point the camera.

FIG. 6 shows a high level block diagram of a logic decisions made to choose how to point the camera. It should be understood that one can control the camera position and angle manually in embodiments of the disclosed technology using, for example, buttons 31 (see FIG. 4) on a control panel or touch screen of a display 30 where the output of the camera 20 is exhibited. Thus, one can retract/extend the camera towards or away from the car and point it towards the left side, right side, any one of the blinkers or license plates (front or rear), in front, or behind the vehicle. The output from the camera is, in turn, displayed on the screen 30 of FIG. 4.

The elements of FIG. 6 can be carried out manually by a person operating buttons 31 to control the camera or automatically such as based on output from an on board diagnostics port (OBD port) of the vehicle. In step 610 it is determined if there is a state change to the car. If not, step 610 is carried out repeatedly until an actual state change is detected, which can include any of steps 620, 630, 640, or 650. In step 620, the left blinker is turned on. The rotating arm (e.g. rotating arm 22) is then rotated so it is perpendicular or substantially perpendicular to the front and/or back of the vehicle and the camera points towards the left blinker, such as shown in FIG. 2. This continues until a new state change is detected. Likewise, if a right blinker is turned on in step 630, this is reported or transmitted electrically through the OBD port and the rotating arm is perpendicular to the car and the camera points towards the right blinker. In this instances, a driver or passenger in the vehicle can ensure that their blinker is working and, in some embodiments, see part or all of their blind spot (the area where a driver lacks vision on the left/right side of the car which is not brought to the viewer's view by either the side view or rear view mirror).

In step 640, it is detected or determined that the car is placed in reverse gear. In this instance, the rotating arm is placed parallel to the car (that is, close to the car on both ends of the rotating arm such that either first end (attached to or closest to the mounting block 24) and second end (attached to or closest to the camera 20) are equidistant or substantially equidistant from back plane of the vehicle). In this manner, the camera can function as a rear view camera and enter the position automatically, whereas when the blinkers are used, it can point towards the blinkers or otherwise towards the left and/or right side of the car to show the blinkers and/or blind spot to the driver.

When the vehicles goes above a certain threshold speed in step 650, which can be determined based on what gear the vehicle is in or the actual speed of travel, it may be desired to protect the camera 20 and rotating arm 22 by retracting them back towards the car. The camera then points away from the vehicle.

Figure 7:
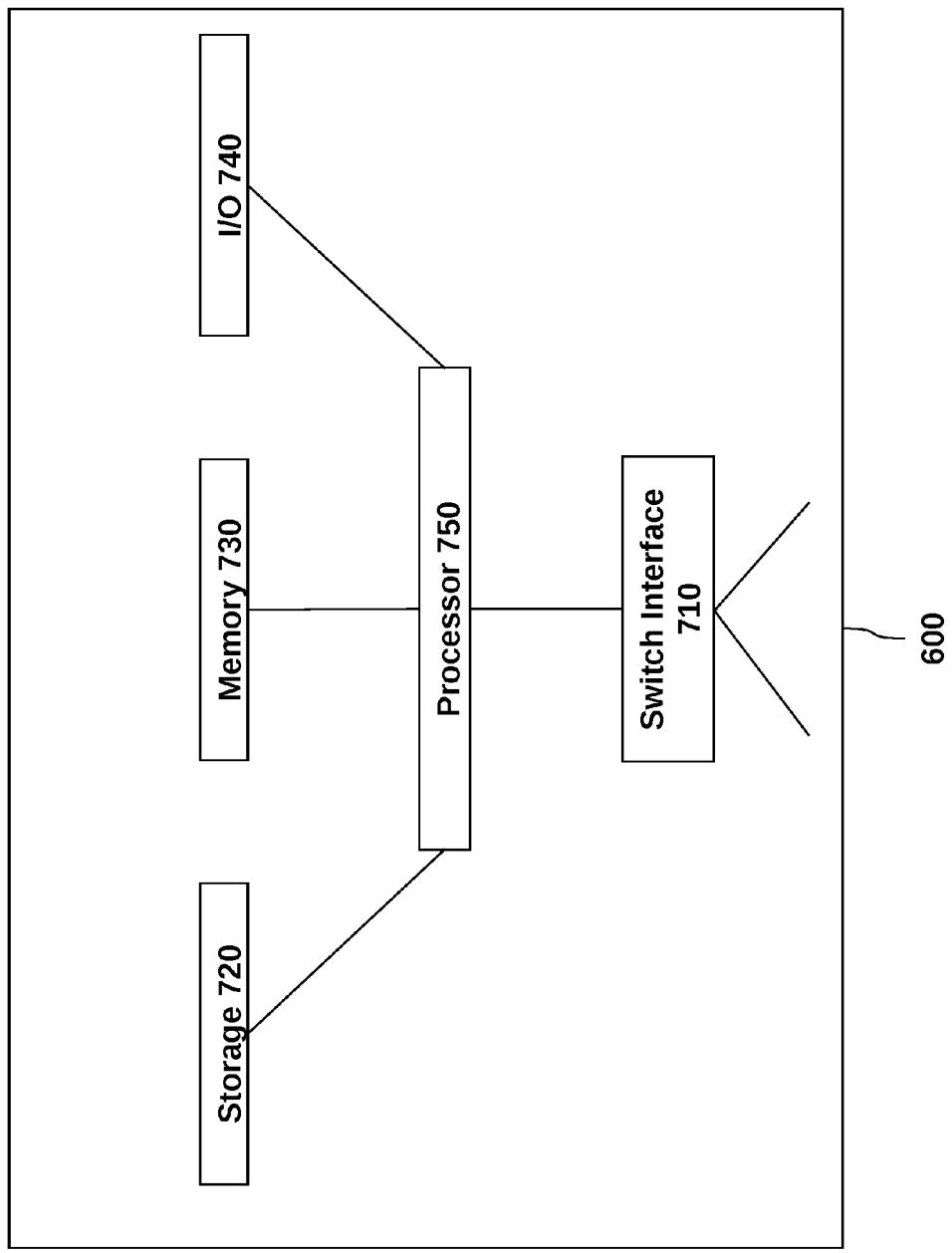
FIG. 7 shows a high level block diagram of a device that may be used to carry out the disclosed technology.

FIG. 7 shows a high level block diagram of a device that may be used to carry out the disclosed technology. Device 700 comprises a processor 750 that controls the overall operation of the device? by executing the measurement device's program instructions which define the devices operation. The measurement device's program instructions may be stored in a storage device 720 (e.g., magnetic disk, flash disk, database) and loaded into memory 730 when execution of the measurement device's program instructions is desired. Thus, the measurement device's operation will be defined by the measurement device's program instructions stored in memory 730 and/or storage 720, and the measurement device will be controlled by processor 750 executing the measurement device's program instructions. A device 700 also includes one or a plurality of input network interfaces for communicating with other devices via a network (e.g., the internet Iot). A device 700 also includes one or more output network interfaces 710 for communicating with other devices. Device 700 also includes input/output 740 representing devices which allow for user interaction with the computer 700 (e.g., display, keyboard, mouse, speakers, buttons, etc.). One skilled in the art will recognize that an implementation of actual devices will contain other components as well, and that FIG. 7 is a high level representation of some of the components of such a measurement device for illustrative purposes. It should also be understood by one skilled in the art that the method and devices depicted in FIGS. 1 through 6 may be implemented on a device such as is shown in FIG. 7.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only illustrative and not restrictive. All changes that come within the meaning and range of equivalency of the claims are to be embraced within their scope. Combinations of any of the methods, systems, and devices described herein above are also contemplated and within the scope of the invention.

I claim:

1. A retractable camera mounted to a rear or front side of a vehicle, comprising:
   a mount fixed to said front or rear of said vehicle;
   a rotating arm rotatably connected to said mount; and
   a camera rotatably connected to said retractable arm;
   wherein said rotating arm has a furtherest range of motion between two extremes:
   a first extreme substantially parallel to said rear or said front of said vehicle, and
   a second extreme substantially perpendicular to said rear or said front of said vehicle.

2. The retractable camera of claim 1, wherein said camera direction is coupled with rotation of said rotating arm such that when said rotating arm is substantially parallel to said rear of said vehicle, said camera points away from said vehicle in a substantially rearward direction.

3. The retractable camera of claim 2, wherein said camera direction is further coupled with rotation of said rotating arm such that when said rotating arm is substantially perpendicular to said rear or said front of said vehicle, a center of a frame of view of said camera substantially shows a corresponding rear or front turn signal, respectively.

4. A retractable camera mounted to a rear or front side of a vehicle, comprising:
   a mount fixed to said front or rear of said vehicle;
   a rotating arm rotatably connected to said mount; and
   a camera rotatably connected to said retractable arm;
   wherein a switch inside an interior of said vehicle is electrically coupled with said rotating arm which, when utilized, causes one of the following three configurations to be carried out:
   a said rotating arm is fully retracted substantially perpendicular to a front or rear side of said car and said camera points away from and in an opposite direction from said car;
   b said rotating arm is substantially perpendicular to said rear or said front side of said car and said camera points substantially towards a left blinker; and
   c said rotating arm is substantially perpendicular to said rear or said front side of said car and said camera points substantially towards a right blinker.

5. The retractable camera of claim 4, wherein said switch is a manual switch controlled by a passenger or driver in said vehicle to effectuate showing of a blinker, license plate, front and/or rear view of said vehicle.

6. The retractable camera of claim 4, wherein said switch is utilized based on one of a change in state of said left blinker, right blinker or gear of said vehicle.

7. The retractable camera of claim 4, wherein use of said left or right blinker causes said switch to carry out one of said configurations a) and b) corresponding to said left or right blinker used.

8. The retractable camera of claim 4, wherein placing said gear of said vehicle in reverse causes said switch to carry out said configuration c).

9. The retractable camera of claim 8, wherein said switch is utilized as a function of output from an onboard diagnostics port of said car.

10. A retractable camera system comprising:
    a visual output within an interior of said vehicle within a frame of view of a driver of said vehicle;
    a camera mounted to a rear or front of said vehicle on a rotating arm such that when said rotating arm is rotated away from said vehicle, a frame of view of said camera includes a blinker of said vehicle which is, in turn, shown on said visual output.

11. The retractable camera system of claim 10, wherein when said rotating arm is rotated such that an end of said rotating arm with said camera is substantially a same distance from a rear of said vehicle as a portion of said rotating arm which connects to a mount on said vehicle, said camera points away from said vehicle showing a rear view on said visual output.

12. The retractable camera system of claim 11, wherein a switch for setting a direction of said camera and an amount of rotating of said rotating arm is provided within said vehicle.

13. The retractable camera system of claim 12, wherein said switch is controlled as a function of output of an onboard diagnostics port, said output comprising indication of use of at least one of a blinker and change in gear.

14. The retractable camera system of claim 13, wherein use of a blinker causes said camera to point towards an activated blinker and said rotating arm to move said camera away from said vehicle.

15. The retractable camera system of claim 13, wherein setting said gear to reverse causes said camera to point rearward with respect to a body of said vehicle and said rotating arm to move said camera towards said vehicle.

16. The retractable camera system of claim 1, wherein said camera shows part or all of a blind spot for a driver of said vehicle.

17. The retractable camera system of claim 10, wherein said visual output comprises output of a blind spot for a driver of said vehicle.

* * * * *